(12) United States Patent
Cho et al.

(10) Patent No.: US 10,710,539 B2
(45) Date of Patent: Jul. 14, 2020

(54) SEATBACK-MOUNTED RESTRAINT SYSTEM

(71) Applicant: Ford Global Technologies, LLC, Dearborn, MI (US)

(72) Inventors: Jaeho Cho, Southfield, MI (US); Robert William McCoy, Ann Arbor, MI (US); Srinivasan Sundararajan, Ann Arbor, MI (US); James Chih Cheng, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 186 days.

(21) Appl. No.: 15/933,749

(22) Filed: Mar. 23, 2018

(65) Prior Publication Data

US 2019/0291678 A1  Sep. 26, 2019

(51) Int. Cl.
*B60R 21/207* (2006.01)
*B60R 21/231* (2011.01)
*B60R 21/00* (2006.01)

(52) U.S. Cl.
CPC .......... *B60R 21/207* (2013.01); *B60R 21/231* (2013.01); *B60R 2021/0004* (2013.01); *B60R 2021/0044* (2013.01); *B60R 2021/0048* (2013.01); *B60R 2021/2074* (2013.01)

(58) Field of Classification Search
CPC ... B60R 21/207; B60R 21/231; B60R 21/233; B60R 2021/0004; B60R 2021/0044; B60R 2021/0048; B60R 2021/2074; B60R 2021/23161; B60R 2021/23308; B60R 2021/23324
See application file for complete search history.

(56) References Cited

U.S. PATENT DOCUMENTS

| | | | |
|---|---|---|---|
| 3,753,576 A | 8/1973 | Gorman | |
| 3,795,412 A * | 3/1974 | John | B60R 21/08 280/730.1 |
| 3,953,049 A * | 4/1976 | Surace | B60R 21/08 280/730.1 |
| 4,508,294 A * | 4/1985 | Lorch | B64D 25/02 244/122 AG |
| 6,315,245 B1 * | 11/2001 | Ruff | B64D 25/02 244/122 AG |
| 7,665,761 B1 * | 2/2010 | Green | B60R 21/18 280/730.1 |

(Continued)

FOREIGN PATENT DOCUMENTS

DE 19859988 B4 6/2010
EP 1193141 B1 11/2004

(Continued)

*Primary Examiner* — Laura Freedman (74) *Attorney, Agent, or Firm* — Frank A. MacKenzie; Bejin Bieneman PLC (57) ABSTRACT

A restraint system includes a seatback and an airbag. The airbag includes two lateral portions and a central chamber connecting the lateral portions. When the airbag is inflated, each lateral portion includes a plurality of lateral chambers arranged consecutively from the seatback to the central chamber, and the lateral portions and central chamber define a gap positioned directly above and directly in front of space for a head of a 50th-percentile dummy sitting against the seatback.

19 Claims, 7 Drawing Sheets

(56) References Cited

U.S. PATENT DOCUMENTS

| | | | |
|---|---|---|---|
| 7,997,615 B2* | 8/2011 | Jang | B60R 21/231 |
| | | | 280/730.1 |
| 8,485,551 B2* | 7/2013 | Dainese | B60R 21/207 |
| | | | 280/730.1 |
| 9,238,425 B2* | 1/2016 | Fukawatase | B60R 21/13 |
| 9,533,651 B1* | 1/2017 | Ohno | B60R 21/23138 |
| 9,573,553 B2 | 2/2017 | Ko et al. | |
| 9,707,921 B2* | 7/2017 | Fischer | B60R 21/231 |
| 9,758,127 B1* | 9/2017 | Farooq | B60R 22/26 |
| 9,783,155 B2* | 10/2017 | Kondo | B60N 2/79 |
| 9,925,943 B2* | 3/2018 | Ohno | B60R 21/207 |
| 9,944,246 B2* | 4/2018 | Ohno | B60R 21/23138 |
| 9,981,624 B2* | 5/2018 | Perlo | B60R 21/23138 |
| 9,994,181 B1* | 6/2018 | Dubaisi | B60R 21/23138 |
| 10,005,417 B2* | 6/2018 | Ohno | B60R 21/207 |
| 10,071,702 B2* | 9/2018 | Ohno | B60R 21/2334 |
| 10,093,266 B2* | 10/2018 | Sugie | B60R 21/01554 |
| 10,112,570 B2* | 10/2018 | Barbat | B60N 2/90 |
| 10,246,043 B2* | 4/2019 | Schneider | B60R 21/214 |
| 10,336,284 B2* | 7/2019 | Dry | B60R 21/2338 |
| 2013/0015642 A1 | 1/2013 | Islam et al. | |
| 2016/0347272 A1* | 12/2016 | Kato | B60R 21/207 |
| 2019/0016293 A1* | 1/2019 | Saso | B60R 21/231 |
| 2019/0023214 A1* | 1/2019 | Kitagawa | B60R 21/01534 |
| 2019/0031132 A1* | 1/2019 | Dry | B60R 21/207 |
| 2019/0054884 A1* | 2/2019 | Dry | B60R 21/2342 |
| 2019/0054890 A1* | 2/2019 | Kwon | B60R 21/23138 |
| 2019/0071046 A1* | 3/2019 | Dry | B60R 21/2342 |
| 2019/0071051 A1* | 3/2019 | Board | B60R 21/231 |
| 2019/0077359 A1* | 3/2019 | Kim | B60R 21/23138 |
| 2019/0217803 A1* | 7/2019 | Dry | B60R 21/207 |
| 2019/0217805 A1* | 7/2019 | Dry | B60R 21/2338 |
| 2019/0275979 A1* | 9/2019 | Dry | B60R 21/207 |

FOREIGN PATENT DOCUMENTS

| | | | |
|---|---|---|---|
| FR | 2667831 A1 | | 4/1992 |
| JP | 4911500 B2 | | 4/2012 |
| JP | 2017105285 A | * | 6/2017 |
| JP | 2017178150 A | * | 10/2017 |
| JP | 2017197000 A | * | 11/2017 |
| JP | 2018083555 A | * | 5/2018 |
| JP | 2019018791 A | * | 2/2019 |

* cited by examiner

SEATBACK-MOUNTED RESTRAINT SYSTEM

BACKGROUND

Vehicles are equipped with airbags. In the event of an impact, an inflator activates and provides inflation medium to the airbags, and the airbags pressurize and act as cushions for occupants during the impact. The airbags are located at various fixed positions in passenger cabins of vehicles. Vehicles typically include a driver airbag mounted in the steering wheel, a passenger airbag mounted in the dashboard in a vehicle-forward direction from the front passenger seat, and side air curtains mounted in the roof rails.

In an autonomous vehicle, seats may be rotatable within the passenger cabin. Airbags that are located in conventional fixed positions in the passenger cabin may not be effective during an impact depending on an orientation of a rotatable seat.

DETAILED DESCRIPTION

A restraint system includes a seatback and an airbag including two lateral portions and a central chamber connecting the lateral portions. When the airbag is inflated, each lateral portion includes a plurality of lateral chambers arranged consecutively from the seatback to the central chamber, and the lateral portions and central chamber define a gap positioned directly above and directly in front of space for a head of a 50th-percentile dummy sitting against the seatback.

The seatback may include a left lateral side and a right lateral side opposite the left lateral side, and the lateral portions may each be inflatable from one of the lateral sides.

The seatback may include a left lateral side and a right lateral side opposite the left lateral side, and the central chamber may extend from the left lateral side to the right lateral side when the airbag is inflated.

The central chamber may extend vertically from space for hips to space for a chest of a 50th-percentile dummy sitting against the seatback when the airbag is inflated.

The lateral portions may extend vertically from above to below space for a head of a 50th-percentile dummy sitting against the seatback when the airbag is inflated.

The lateral portions may extend forward from the seatback to in front of space for a head of a 50th-percentile dummy sitting against the seatback when the airbag is inflated.

The seatback may include a left lateral side, a right lateral side opposite the left lateral side, and a headrest; the airbag may be inflatable from an uninflated position; and the airbag in the uninflated position may extend along the right lateral side, above the headrest, and along the left lateral side.

The seatback may include a headrest; the lateral portions may include a left lateral portion and a right lateral portion; and when the airbag is inflated, the gap may extend from the headrest to the central chamber and from the left lateral portion to the right lateral portion.

The seatback may include a left lateral side and a right lateral side opposite the left lateral side; the lateral portions may include a left lateral portion and a right lateral portion; and the left lateral portion may include a first chamber bordering the left lateral side and a second chamber bordering the central chamber when the airbag is inflated. The first chamber may not border the central chamber when the airbag is inflated.

The second chamber may not border the left lateral side when the airbag is inflated.

The first chamber may be fluidly connected to the second chamber, and the second chamber may be fluidly connected to the central chamber. The first chamber may be fluidly connected to the central chamber only via the second chamber.

The restraint system may further include an inflatable tube attached to the central chamber. The inflatable tube may be disposed below the central chamber when the airbag is inflated.

The seatback may include a left lateral side and a right lateral side opposite the left lateral side, and the inflatable tube may extend from the left lateral side to the right lateral side.

The inflatable tube may be fluidly isolated from the central chamber.

The inflatable tube and airbag may be arranged so that during inflation the inflatable tube inflates before the airbag inflates.

A restraint system 30 includes a seatback 32 and an airbag 34. The airbag 34 includes two lateral portions 36, 38 and a central chamber 40 connecting the lateral portions 36, 38. When the airbag 34 is inflated, each lateral portion 36, 38 includes a plurality of lateral chambers 42, 44 arranged consecutively from the seatback 32 to the central chamber 40, and the lateral portions 36, 38 and central chamber 40 define a gap 46 positioned directly above and directly in front of space for a head of a 50th-percentile dummy sitting against the seatback 32.

The restraint system 30 includes the airbag 34 extending around an occupant to retain the occupant in a seat 56 during a sudden deceleration of the vehicle 48, e.g., during a vehicle impact. The chambers 40, 42, 44 of the airbag 34 are arranged so that the airbag 34 can deploy over an occupant's head and inflate around the occupant without catching on the occupant, for example, by the chambers 40, 42, 44 inflating sequentially. The airbag 34, e.g., the central chamber 40, is shaped to help retain an occupant in the seat 56 during a sudden deceleration even if the occupant is unbelted, which may reduce injury. The position of the gap 46 may reduce rotational forces on the occupant's head during an impact, which may reduce injury.

Figure 1:
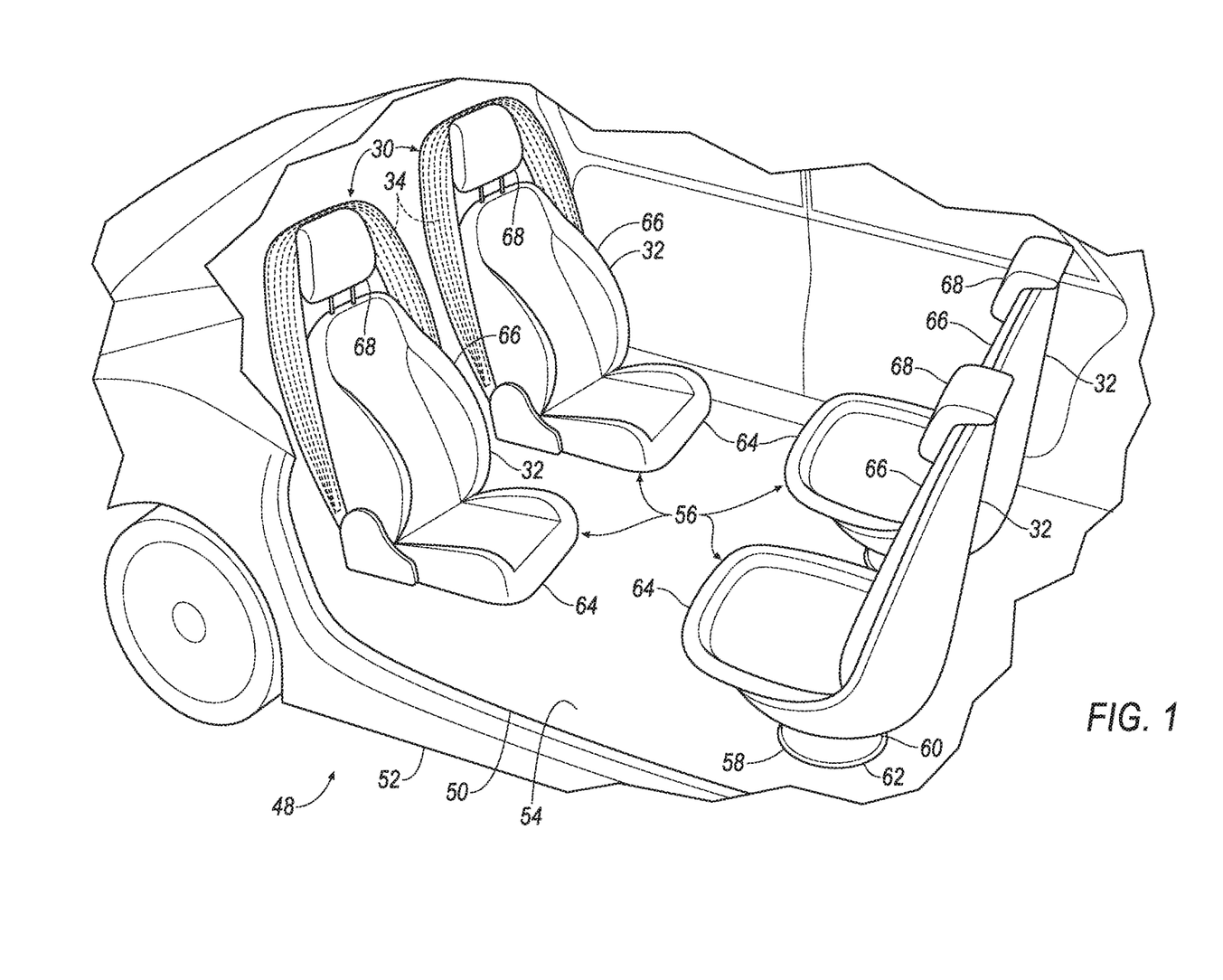
FIG. 1 is a perspective view of a vehicle with a passenger cabin exposed for illustration.

With reference to FIG. 1, the vehicle 48 may be an autonomous vehicle. A computer (not shown) can be configured to operate the vehicle 48 independently of the intervention of a human driver, completely or to a lesser degree. The computer may be programmed to operate the propulsion, brake system, steering, and/or other vehicle systems. For the purposes of this disclosure, autonomous operation means the computer controls the propulsion, brake system, and steering; semi-autonomous operation means the computer controls one or two of the propulsion, brake system, and steering and a human driver controls the remainder; and nonautonomous operation means the human driver controls the propulsion, brake system, and steering.

The vehicle 48 includes a passenger cabin 50. The passenger cabin 50 houses occupants, if any, of the vehicle 48. The passenger cabin 50 may be surrounded and/or defined by a body 52 of the vehicle 48. A floor 54 may define a bottom of the passenger cabin 50.

The vehicle 48 may include one or more seats 56 for occupants of the vehicle 48. The seat or seats 56 may be supported on the floor 54. In examples in which the vehicle 48 includes multiple seats 56, the seats 56 may be substantially identical. Each seat 56 may be a bucket seat, as shown in the Figures, bench seat, or another type of seat. Each seat 56 defines a front direction as a direction faced by an occupant sitting in the seat 56.

The floor 54 may rotatably support the seat 56 such that the seat 56 is rotatable about an axis transverse to the floor 54. For example, the seat 56 may be rotatably coupled to the floor 54 via a rotational mechanism 58 configured to rotatably support the seat 56 on the floor 54 of the vehicle 48 such that the seat 56 is rotatable about an axis transverse to the floor 54. The rotational mechanism 58, for example, may include a pedestal 60 connected to one of the seat 56 and the floor 54, and a bearing 62 connected to the other of the seat 56 and the floor 54 and rotatably receiving the pedestal 60. In examples where the vehicle 48 includes multiple seats 56, some or all seats 56 may be rotatable about their own vertical axes relative to the passenger cabin 50. The seat 56 may face a vehicle-forward direction, a vehicle-rearward direction, or any direction in between. Whichever direction the seat 56 is facing is the forward direction relative to the seat 56.

Figure 2:
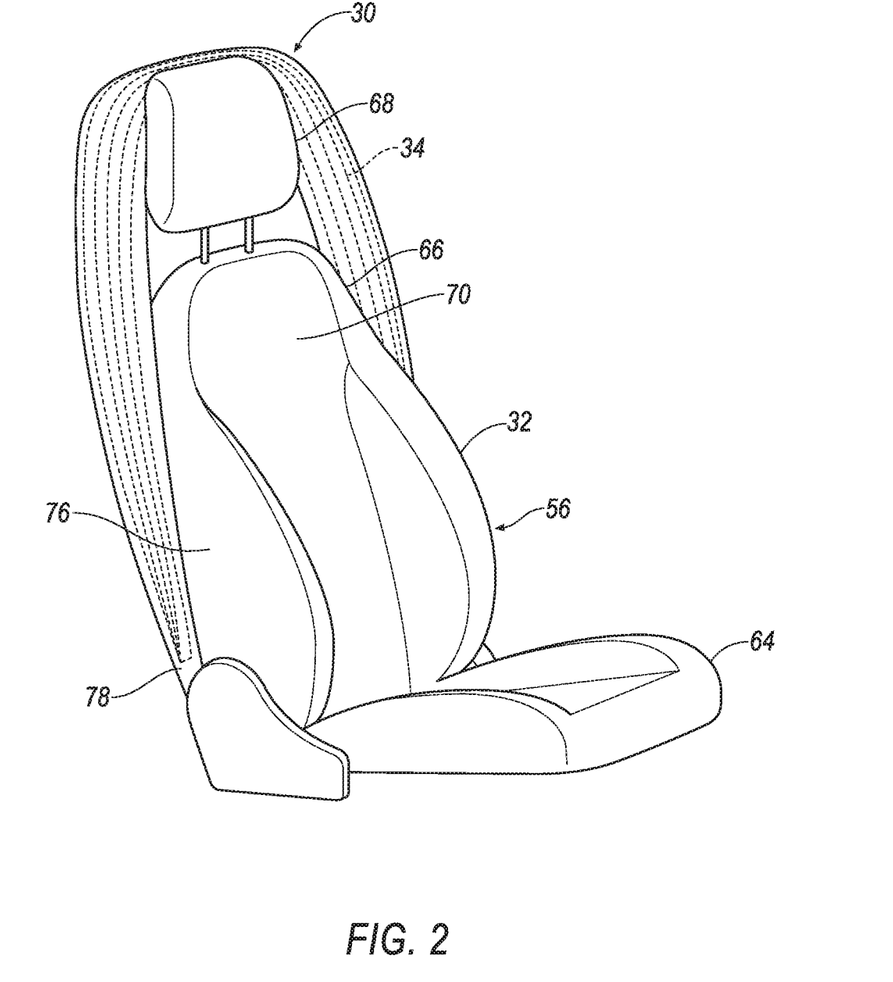
FIG. 2 is a perspective view of a seat of the vehicle with an airbag in an uninflated position.

With reference to FIG. 2, the seatback 32 may be supported by a seat bottom 64 and may be stationary or movable relative to the seat bottom 64. For example, the seatback 32 may be tilted relative to the seat bottom 64. In addition, or in the alternative, the seatback 32 and/or the seat bottom 64 may be adjustable in multiple degrees of freedom relative to each other. Specifically, the seatback 32 and/or the seat bottom 64 may themselves be adjustable, in other words, have adjustable components within the seatback 32 and/or the seat bottom 64, and/or may be adjustable relative to each other.

The seatback 32 includes a back portion 66 and a headrest 68 above the back portion 66. The headrest 68 is positioned to support a head of an occupant sitting in the seat 56, and the back portion 66 is positioned to support the occupant's back. The seatback 32, specifically the back portion 66, includes a front side 70 that the occupant contacts when sitting in the seat 56, a back side 72 facing the opposite direction as the front side 70, and a left lateral side 74 and a right lateral side 76 facing laterally. The right lateral side 76 is disposed opposite the left lateral side 74 and faces the opposite direction as the left lateral side 74. The front side 70 and the back side 72 extend laterally between the left lateral side 74 and the right lateral side 76.

Figure 3:
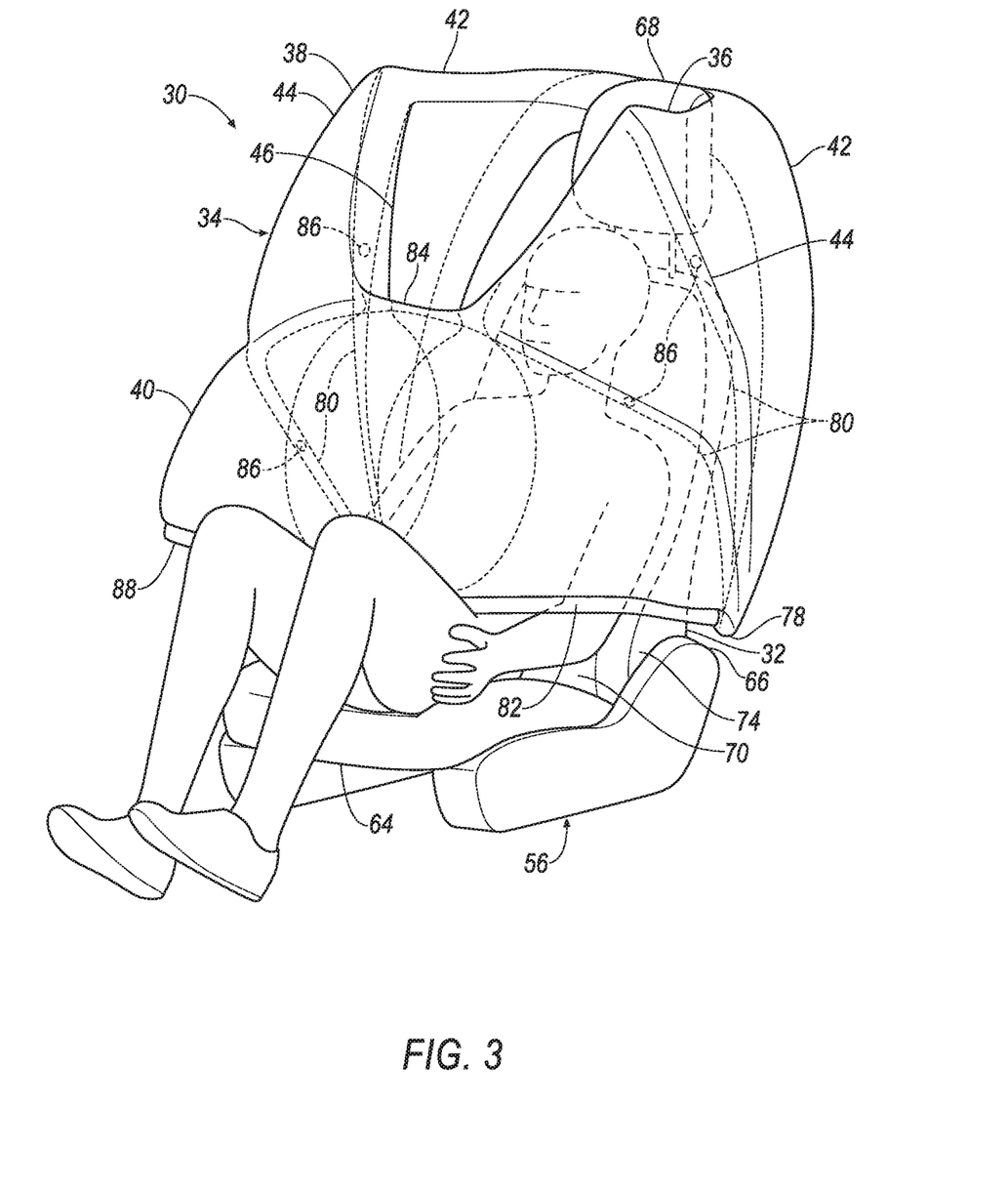
FIG. 3 is a perspective view of the seat with the airbag in an inflated position.
Figure 4:
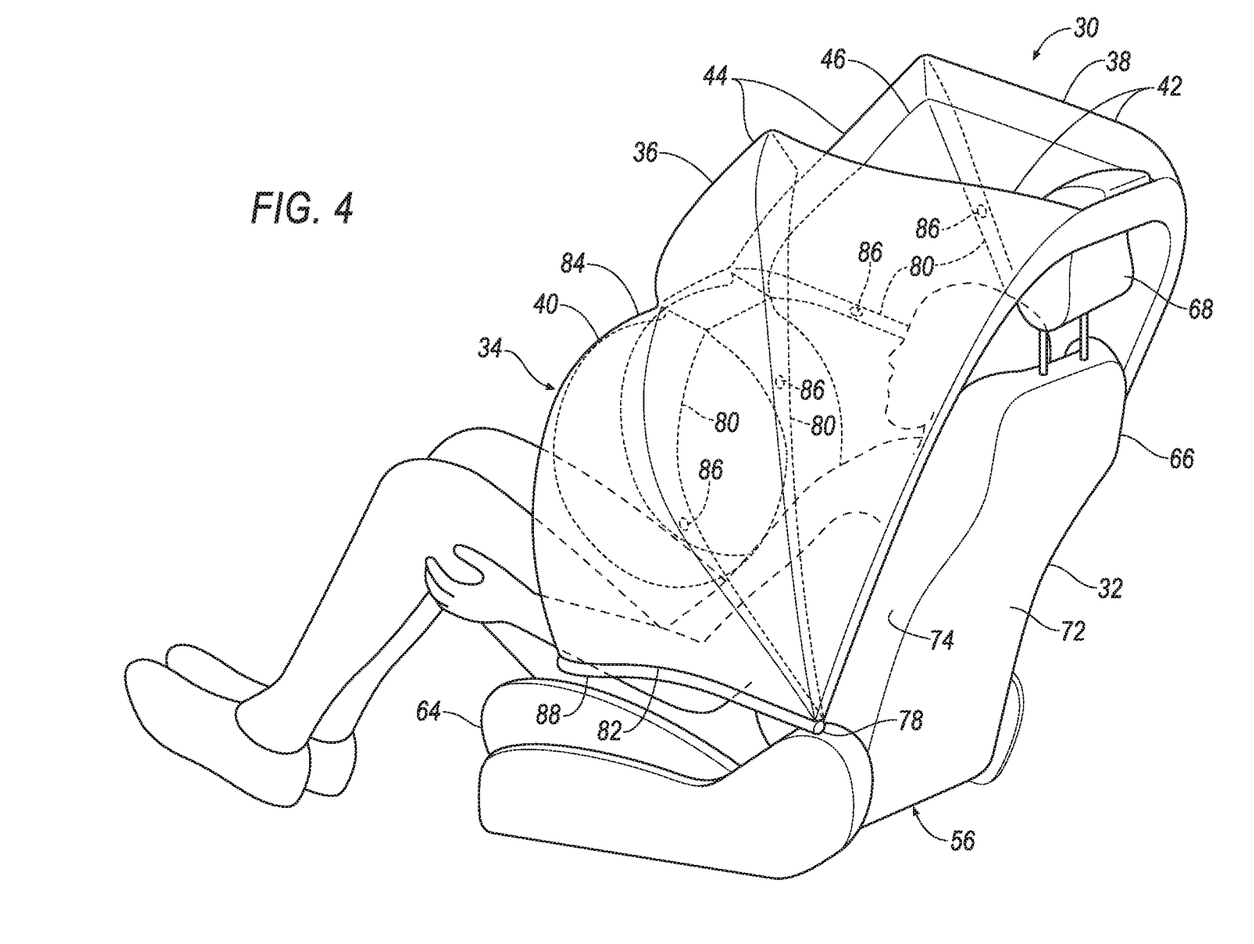
FIG. 4 is a rear perspective view of the seat with the airbag in the inflated position.
Figure 5:
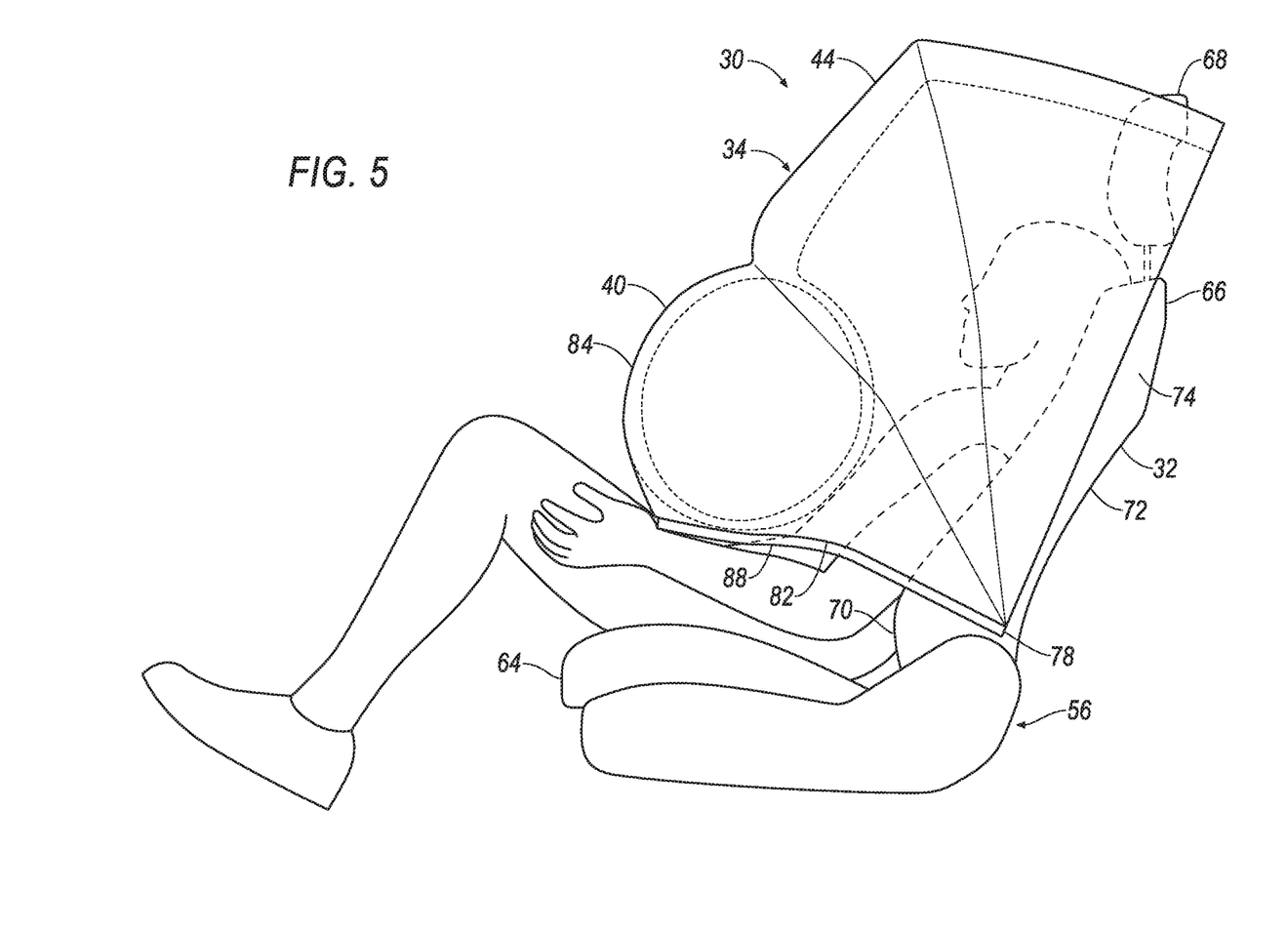
FIG. 5 is a side view of the seat with the airbag in the inflated position.
Figure 6:
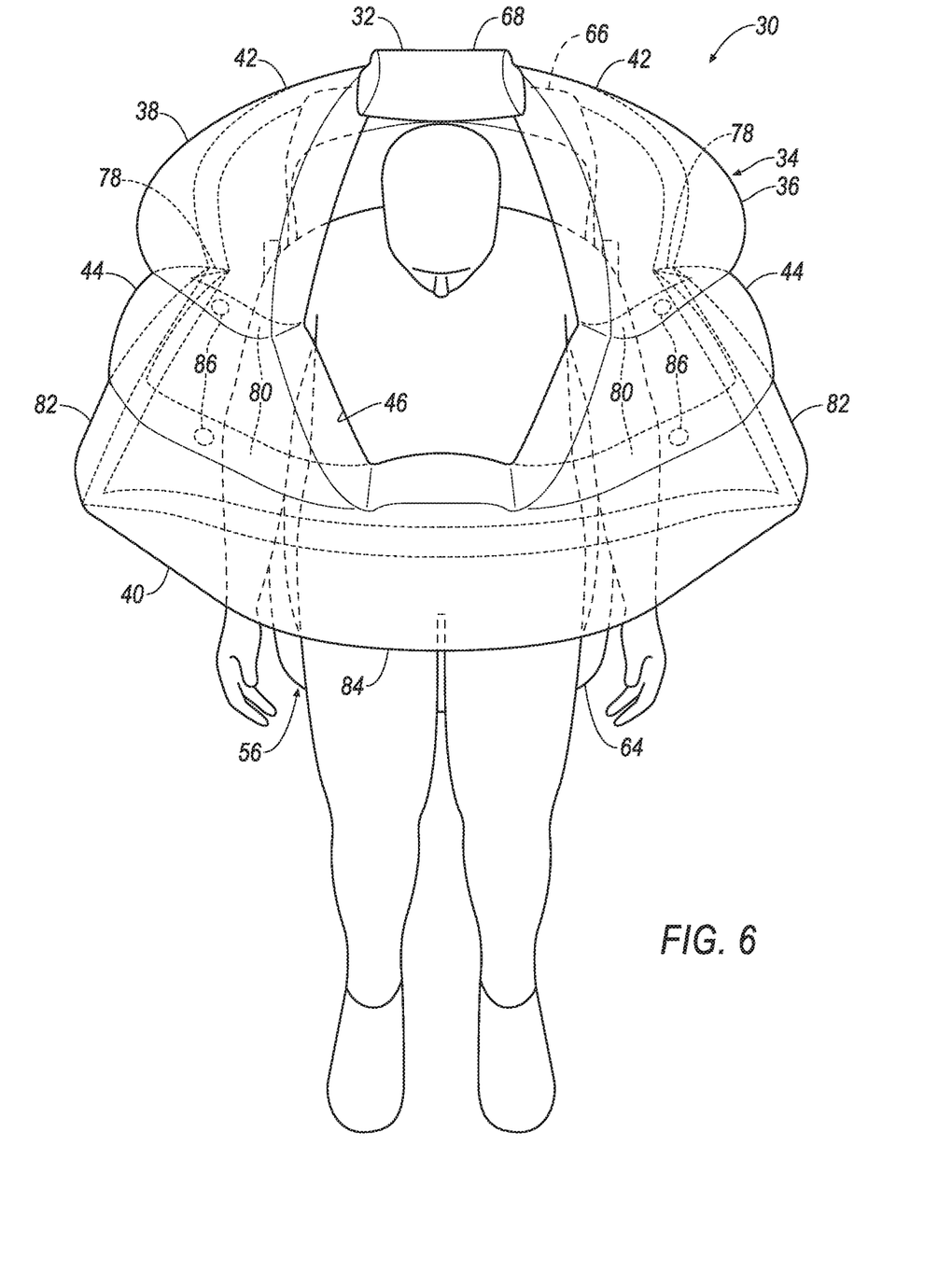
FIG. 6 is a top view of the seat with the airbag in the inflated position.

With reference to FIGS. 2 and 3, the airbag 34 is inflatable from the seatback 32. Specifically, the airbag 34 is inflatable from an uninflated position disposed in the seatback 32, as shown in FIG. 2, to an inflated position in front of and beside the seatback 32, as shown in FIG. 3. The airbag 34 in the uninflated position may extend along the right lateral side 76, above the headrest 68, and along the left lateral side 74. The airbag 34 in the uninflated position may be folded in a zig-zag pattern, rolled, a combination folded and rolled, etc. The airbag 34 in the inflated position may extend from the left lateral side 74, in front of the front side 70, and to the right lateral side 76. The airbag 34 in the inflated position and the seatback 32 may together extend around a torso of an occupant sitting in the seat 56.

The airbag 34 may be formed of any suitable airbag material, for example, a woven polymer. For example, the airbag 34 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

With reference to FIGS. 3-6, the airbag 34 includes a left lateral portion 36, a right lateral portion 38, and the central chamber 40 connecting the lateral portions 36, 38. The lateral portions 36, 38 each include the plurality of lateral chambers 42, 44. For the purposes of this disclosure, "chamber" is defined as a section of an airbag 34 that is enclosed except for small openings such as inlets, outlets, vents 86 (described below), etc.

The left lateral portion 36 is deployable from the left lateral side 74, and the right lateral portion 38 is deployable from the right lateral side 76. When the airbag 34 is in the uninflated position, the lateral portions 36, 38 are folded, rolled, etc. in the seatback 32 at the lateral sides 74, 76. When the airbag 34 is in the inflated position, the lateral portions 36, 38 extend vertically from above to below space for a head of a 50th-percentile dummy sitting against the seatback 32 and extend forward from the seatback 32 to in front of space for a head of a 50th-percentile dummy sitting against the seatback 32. For the purposes of this disclosure, "space for a body part of a dummy" means an empty volume where the body part would be located if the dummy were sitting against the seatback 32, i.e., sitting in the seat 56 in a standard sitting posture, i.e., in a sitting posture used for dummies during safety testing for in-position occupants. For the purposes of this disclosure, "a 50th-percentile dummy" means an anthropomorphic testing device sold as being in a 50th percentile of size, either for the world or for a region of interest, e.g., the Hybrid III 50th Percentile Male Crash Test Dummy or the Test device for Human Occupant Restraint (THOR) 50th Male. The lateral portions 36, 38 may be shaped approximately like circle sectors with radii extending along the lateral sides 74, 76 and along the central chamber 40, the radii meeting at an anchor 78 where the central chamber 40 is attached to the seatback 32.

Each lateral portion 36, 38 includes the plurality of lateral chambers 42, 44 arranged consecutively from the seatback 32 to the central chamber 40. For the purposes of this disclosure, "arranged consecutively" means attached to one another in series, i.e., one is attached to the next, which is attached to the next, which is attached to the next, etc. The lateral chambers 42, 44 include a first lateral chamber 42, a second lateral chamber 44, and possibly other lateral chambers 42, 44. (The adjectives "first" and "second" are used throughout this document as identifiers and are not intended to signify importance or order.) When the airbag 34 is in the inflated position, the first lateral chamber 42 of each lateral portion 36, 38 borders the respective lateral side of the seatback 32, i.e., has an elongated attachment to the respective lateral side of the seatback 32. When the airbag 34 is in the inflated position, the first lateral chamber 42 may be attached to the central chamber 40 at, e.g., the anchor 78, but the first lateral chamber 42 does not border the central chamber 40. When the airbag 34 is in the inflated position, the second lateral chambers 44 border the central chamber 40; for example, each second lateral chamber 44 and the central chamber 40 may share a wall 80. When the airbag 34 is in the inflated position, the second lateral chamber 44 may be attached to the respective lateral side of the seatback 32 at, e.g., the anchor 78 but does not border the respective lateral side 74, 76. If each lateral portion 36, 38 includes only two lateral chambers 42, 44, then when the airbag 34 is in the inflated position, the first lateral chamber 42 may border the respective second lateral chamber 44; for example, the first and second lateral chambers 42, 44 may share a wall 80. In general, each lateral chamber 42, 44 may either border two chambers 40, 42, 44 that do not border each other or border a chamber 40, 42, 44 and a lateral side 74, 76 that do not border each other.

The central chamber 40 extends from the left lateral side 74 to the right lateral side 76. When the airbag 34 is in the inflated position, the central chamber 40 extends horizontally around space for a torso of a 50th-percentile dummy sitting against the seatback 32, e.g., tracing a U-shape starting from one of the anchors 78, directly beside a right side of space for the torso, directly in front of space for the torso, directly beside space for a left side of the torso, to the other anchor 78. For the purposes of this disclosure, "A is directly in front of B" means A intersects a line extending straight forward (i.e., not up, down, left, or right) from B, and "A is directly beside B" means A intersects a line extending straight laterally (i.e., not up, down, forward, or backward) from B. When the airbag 34 is in the inflated position, the central chamber 40 extends vertically from space for hips to space for a chest of a 50th-percentile dummy sitting against the seatback 32. When the airbag 34 is in the inflated position, the central chamber 40 may include two triangular sections 82 connected to a central section 84. The triangular sections 82 may extend directly beside space for a torso of a 50th-percentile dummy sitting against the seatback 32, and the central section 84 may extend directly in front of space for the torso.

The walls 80 may be shared panels between multiple chambers 40, 42, 44, e.g., shared panels between the central chamber 40 and the second lateral chambers 44, and shared panels between adjacent lateral chambers 42, 44 of the lateral portions 36, 38. The walls 80 may be a single layer of fabric or multiple layers of fabric.

The lateral chambers 42, 44 of each of the lateral portions 36, 38 may be fluidly connected in series. For the purposes of this disclosure, "fluidly connected" means having a flowpath along which fluid can move. The first chamber may be fluidly connected to the second chamber. For example, if each lateral portion 36, 38 has two lateral chambers 42, 44, the first lateral chamber 42 and the second lateral chamber 44 may be directly fluidly connected, i.e., fluidly connected without any intermediary chamber. For another example, if each lateral portion 36, 38 has more than two lateral chambers 42, 44, the first lateral chamber 42 and the second lateral chamber 44 may be indirectly fluidly connected via an intermediary chamber (not shown). The central chamber 40 may be directly fluidly connected to one or both second lateral chambers 44 and indirectly fluidly connected to one or both first lateral chambers 42.

Each wall 80 between two chambers 40, 42, 44 may include one or more vents 86 directly fluidly connecting the two chambers 40, 42, 44. Each vent 86 may be, for example, an open vent, a one-way vent, a two-way vent, or an active vent. Each vent 86 may have a pressure threshold before opening. The pressure threshold may be met when, e.g., the high-pressure chamber is mostly full. Alternatively, a tether (not shown) may be elongated through one of the lateral chambers 42, 44 and positioned to open the vent 86 leading to the next lateral chamber 42, 44 or the central chamber 40 when the lateral chamber 42, 44 is nearly fully inflated, e.g., by being shorter than a distance between the vent 86 and an attachment point of an opposite end of the tether when the lateral chamber 42, 44 is fully inflated. The vents 86 may thus be adapted to cause the chambers 40, 42, 44 to open in sequence when the airbag 34 is inflating.

When the airbag 34 is in the inflated position, the lateral portions 36, 38 and the central chamber 40 define the gap 46 for an occupant's head. When the airbag 34 is in the inflated position, the gap 46 extends from the headrest 68 to the central chamber 40 and from the left lateral portion 36 to the right lateral portion 38. When the airbag 34 is in the inflated position, the gap 46 is positioned directly above and directly in front of space for a head of a 50th-percentile dummy sitting against the seatback 32. When the airbag 34 is in the inflated position, the gap 46 is laterally wider than a width of a head of a 50th-percentile dummy and laterally narrower than shoulders of a 50th-percentile dummy. The gap 46 may be positioned to permit through a head of a 50th-percentile dummy sitting against the seatback 32, i.e., provide a space for the head to tilt forward above the central chamber 40 and outside of being between the lateral portions 36, 38, during a frontal impact.

An inflatable tube 88 may be attached, e.g., sewn, to the central chamber 40. The inflatable tube 88 may be disposed below the central chamber 40 when the airbag 34 is in the inflated position. The inflatable tube 88 extends from the left lateral side 74 to the right lateral side 76, e.g., from one anchor 78 to the other anchor 78. The inflatable tube 88 may be fluidly isolated from the central chamber 40, i.e., lack a flowpath along which fluid can move between the inflatable tube 88 and the central chamber 40, i.e., be impermeably divided from the central chamber 40. The inflatable tube 88 may be positioned to rotate about the anchors 78 as the airbag 34 inflates.

Figure 7:
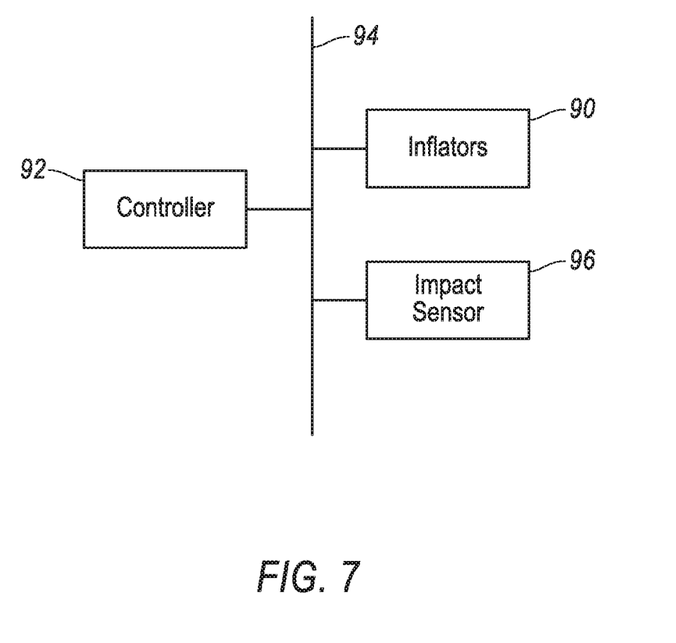
FIG. 7 is a block diagram of a control system for the airbag.

With reference to FIG. 7, one or more inflators 90 are disposed in the seatback 32. The inflators 90 may be fluidly connected to the inflatable tube 88 and to the airbag 34. The inflators 90 may be directly fluidly connected to, e.g., the first lateral chambers 42. Upon receiving a signal from, e.g., a controller 92, the inflators 90 may inflate the inflatable tube 88 and the airbag 34 with an inflatable medium, such as a gas. The inflators 90 may be, for example, pyrotechnic inflators that use a chemical reaction to drive inflation medium to the inflatable tube 88 and to the airbag 34. The inflators 90 may be of any suitable type, for example, cold-gas inflators.

The controller 92 is a microprocessor-based computer. The controller 92 includes a processor, memory, etc. The memory of the controller 92 includes memory for storing instructions executable by the processor as well as for electronically storing data and/or databases. The controller 92 may be, e.g., a restraint control module, which may be in communication with and may control seatbelts in the vehicle 48, among other functions. The controller 92 may be the same computer used for autonomous operation or a different computer.

The controller 92 may transmit and receive data through a communications network 94 such as a controller area network (CAN) bus, Ethernet, WiFi, Local Interconnect Network (LIN), onboard diagnostics connector (OBD-II), and/or by any other wired or wireless communications network. The controller 92 may be communicatively coupled to the inflators 90, an impact sensor 96, and other components via the communications network 94.

The impact sensor 96 is adapted to detect an impact to the vehicle 48. The impact sensor 96 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 96 may be located at numerous points in or on the vehicle 48.

In the event of an impact to the vehicle 48, the impact sensor 96 may detect the impact and transmit a signal through the communications network 94 to the controller 92. The controller 92 may transmit a signal through the communications network 94 to the inflators 90. The inflators 90 may discharge and inflate the inflatable tether and the airbag 34. The controller 92 may be programmed to inflate one or some inflators 90 at a preset time after another or other inflators 90. The inflatable tube 88 and the airbag 34 may be arranged so that during inflation the inflatable tube 88 inflates before the airbag 34 inflates; for example, the inflatable tube 88 may be fluidly connected to the inflators 90 that the controller 92 is programmed to inflate earlier, and the airbag 34 may be fluidly connected to the inflators 90 that the controller 92 is programmed to inflate after the preset time. The inflatable tube 88 may inflate before the airbag 34. The airbag 34 may inflate sequentially by chamber 40, 42, 44; i.e., the first lateral chambers 42 may inflate before the second lateral chambers 44 inflate, and the second lateral chambers 44 may inflate before the central chamber 40 inflates. The sequential inflation of the airbag 34 may reduce a likelihood of the airbag 34 intersecting the occupant before full inflation by pushing the airbag 34 forward around the occupant's head during inflation. The inflators 90 may supply inflation medium directly to the first lateral chambers 42 and indirectly to the second lateral chambers 44 and central chamber 40 via the vents 86. As the airbag 34 inflates, the inflatable tube 88 rotates about the anchors 78 to a position directly in front of a waist of an occupant of the seat 56. The inflated inflatable tube 88 may provide stiffness to the airbag 34 while the airbag 34 inflates, which may also reduce the likelihood of the airbag 34 intersecting the occupant before full inflation. If the occupant has forward or oblique momentum relative to the seat 56, the airbag 34 may restrain and cushion the occupant. If the occupant has momentum rearward relative to the seat 56, the airbag 34 may restrain the occupant and provide cushioning during a rebound from the impact. The position of the gap 46 may reduce rotational forces experienced by the occupant's head.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system comprising:
   a seatback; and
   an airbag including two lateral portions and a central chamber connecting the lateral portions;
   wherein when the airbag is inflated, each lateral portion includes a plurality of lateral chambers arranged consecutively from the seatback to the central chamber, and the lateral portions and central chamber define a gap positioned directly above and directly in front of space for a head of a 50th-percentile dummy sitting against the seatback;
   the seatback includes a left lateral side, a right lateral side opposite the left lateral side, and a headrest;
   the airbag is inflatable from an uninflated position; and
   the airbag in the uninflated position extends along the right lateral side, above the headrest, and along the left lateral side.

2. The restraint system of claim 1, wherein the lateral portions are each inflatable from one of the lateral sides.

3. The restraint system of claim 1, wherein the central chamber extends from the left lateral side to the right lateral side when the airbag is inflated.

4. The restraint system of claim 1, wherein the central chamber extends vertically from space for hips to space for a chest of a 50th-percentile dummy sitting against the seatback when the airbag is inflated.

5. The restraint system of claim 1, wherein the lateral portions extend vertically from above to below space for a head of a 50th-percentile dummy sitting against the seatback when the airbag is inflated.

6. The restraint system of claim 1, wherein the lateral portions extend forward from the seatback to in front of space for a head of a 50th-percentile dummy sitting against the seatback when the airbag is inflated.

7. The restraint system of claim 1, wherein the lateral portions include a left lateral portion and a right lateral portion; and when the airbag is inflated, the gap extends from the headrest to the central chamber and from the left lateral portion to the right lateral portion.

8. The restraint system of claim 1, wherein the lateral portions include a left lateral portion and a right lateral portion; and the left lateral portion includes a first chamber bordering the left lateral side and a second chamber bordering the central chamber when the airbag is inflated.

9. The restraint system of claim 8, wherein the first chamber does not border the central chamber when the airbag is inflated.

10. The restraint system of claim 8, wherein the first chamber is fluidly connected to the second chamber, and the second chamber is fluidly connected to the central chamber.

11. The restraint system of claim 10, wherein the first chamber is fluidly connected to the central chamber only via the second chamber.

12. The restraint system of claim 1, further comprising an inflatable tube attached to the central chamber.

13. The restraint system of claim 12, wherein the inflatable tube is disposed below the central chamber when the airbag is inflated.

14. The restraint system of claim 12, wherein the seatback includes a left lateral side and a right lateral side opposite the left lateral side, and the inflatable tube extends from the left lateral side to the right lateral side.

15. The restraint system of claim 12, wherein the inflatable tube is fluidly isolated from the central chamber.

16. The restraint system of claim 12, wherein the inflatable tube and airbag are arranged so that during inflation the inflatable tube inflates before the airbag inflates.

17. A restraint system comprising:
    a seatback; and
    an airbag including two lateral portions and a central chamber connecting the lateral portions;
    wherein when the airbag is inflated, each lateral portion includes a plurality of lateral chambers arranged consecutively from the seatback to the central chamber, and the lateral portions and central chamber define a gap positioned directly above and directly in front of space for a head of a 50th-percentile dummy sitting against the seatback;

the seatback includes a left lateral side and a right lateral side opposite the left lateral side;

the lateral portions include a left lateral portion and a right lateral portion;

the left lateral portion includes a first chamber bordering the left lateral side and a second chamber bordering the central chamber when the airbag is inflated;

the first chamber is fluidly connected to the second chamber, and the second chamber is fluidly connected to the central chamber; and the first chamber is fluidly connected to the central chamber only via the second chamber.

18. A restraint system comprising:

a seatback;

an airbag including two lateral portions and a central chamber connecting the lateral portions; and an inflatable tube attached to the central chamber;

wherein when the airbag is inflated, each lateral portion includes a plurality of lateral chambers arranged consecutively from the seatback to the central chamber, and the lateral portions and central chamber define a gap positioned directly above and directly in front of space for a head of a 50th-percentile dummy sitting against the seatback; and the inflatable tube is fluidly isolated from the central chamber.

19. A restraint system comprising:

a seatback;

an airbag including two lateral portions and a central chamber connecting the lateral portions; and an inflatable tube attached to the central chamber;

wherein when the airbag is inflated, each lateral portion includes a plurality of lateral chambers arranged consecutively from the seatback to the central chamber, and the lateral portions and central chamber define a gap positioned directly above and directly in front of space for a head of a 50th-percentile dummy sitting against the seatback; and the inflatable tube and airbag are arranged so that during inflation the inflatable tube inflates before the airbag inflates.

* * * * *